US007613257B2

(12) United States Patent
El Fawal et al.

(10) Patent No.: US 7,613,257 B2
(45) Date of Patent: Nov. 3, 2009

(54) SYNCHRONIZING METHOD FOR IMPULSE RADIO NETWORK

(75) Inventors: Alaeddine El Fawal, Ecublens (CH); Jean-Yves Le Boudec, Jouxtens-Mezery (CH)

(73) Assignee: Ecole Polytechnique Federale de Lausanne, Lausanne (CH)

( * ) Notice: Subject to any disclaimer, the term of this patent is extended or adjusted under 35 U.S.C. 154(b) by 530 days.

(21) Appl. No.: 11/260,390

(22) Filed: Oct. 28, 2005

(65) Prior Publication Data

US 2006/0093077 A1     May 4, 2006

Related U.S. Application Data

(60) Provisional application No. 60/622,787, filed on Oct. 29, 2004.

(51) Int. Cl.
*H03D 1/00*     (2006.01)

(52) U.S. Cl. .................. 375/343; 375/260; 375/150; 375/354

(58) Field of Classification Search .......... 375/152, 375/150, 148, 149, 346, 260, 354, 343; 455/456.5
See application file for complete search history.

(56) References Cited

U.S. PATENT DOCUMENTS

| 6,556,621 | B1 |   | 4/2003 | Richards et al. |         |
|-----------|----|---|--------|-----------------|---------|
| 6,741,637 | B1 | * | 5/2004 | Shen et al.     | 375/149 |
| 6,842,480 | B1 | * | 1/2005 | Yang et al.     | 375/152 |
| 6,901,264 | B2 | * | 5/2005 | Myr             | 455/456.5 |
| 6,996,162 | B1 | * | 2/2006 | Hosur et al.    | 375/150 |
| 2002/0064245 | A1 | * | 5/2002 | McCorkle     | 375/346 |
| 2004/0161064 | A1 |   | 8/2004 | Brethour et al. |      |
| 2004/0179585 | A1 | * | 9/2004 | Yang et al.    | 375/148 |

FOREIGN PATENT DOCUMENTS

WO     WO 01/93444 A1     12/2001

OTHER PUBLICATIONS

E. A. Homier and R. A. Scholtz. "Rapid Acquisition of Ultra-wideband Signals in the Dense Multipath Channel". IEEE Conference on Ultra Wideband Systems and Technologies, 2002.

Moe Z. Win, Robert A. Scholtz. "Ultra-Wide Bandwidth Time-Hopping Spread-Spectrum Impulse Radio for Wireless Multiple-Access Communications". IEEE Transactions on Communications, vol. 48, No. 4, Apr. 2000.

M. Z. Win, R. A. Scholtz, and M. A. Barnes. "Ultra-wide bandwidth signal propagation for indoor wireless communications". In Proc. IEEE Int. Conf. Communications, vol. 1, Montreal, Canada, Jun. 1997, pp. 56 60.

* cited by examiner

*Primary Examiner*—Sudhanshu C Pathak
(74) *Attorney, Agent, or Firm*—Harness, Dickey & Pierce, P.L.C.

(57) ABSTRACT

A method to synchronize impulse radio signal in a receiver based on a cross-correlation between an input signal and a template pulse train is described. The method comprises the steps of receiving a radio signal, performing a correlation between the acquired radio signal and a template pulse train, splitting the correlation into at least two elementary correlations over intervals of predefined length and separated by a predetermined time to obtain elementary correlation output, performing an elementary threshold check on each elementary correlation output, summing the elementary threshold check outputs to form a sum result.

5 Claims, 6 Drawing Sheets

Fig. 1
Conventional Art
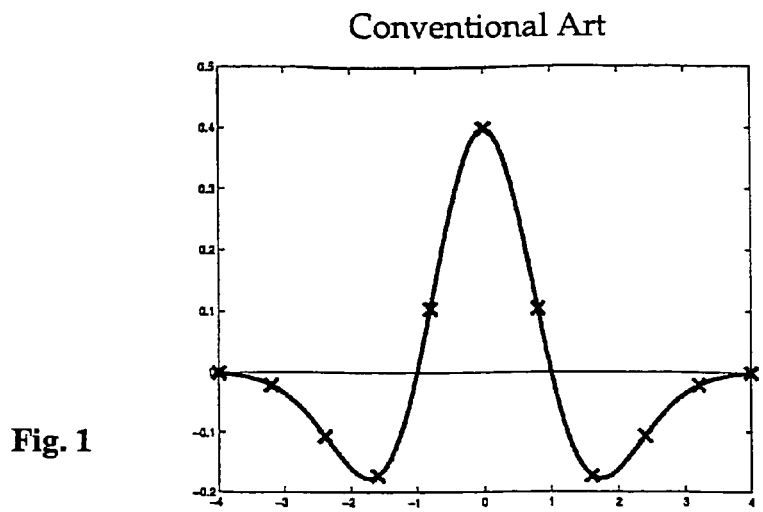
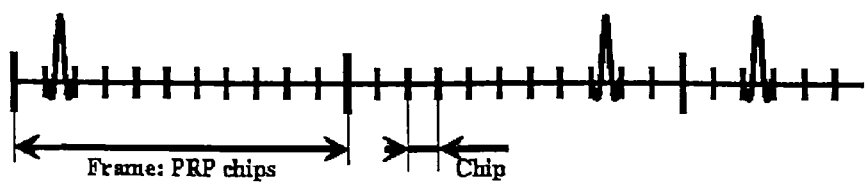
Conventional Art       Fig. 2
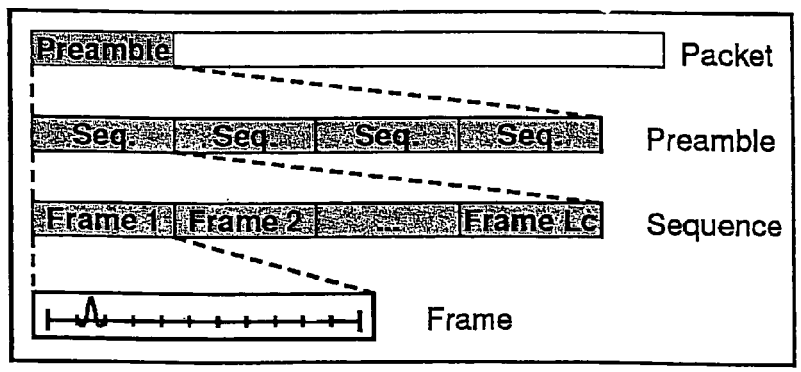
Fig. 3
Conventional Art
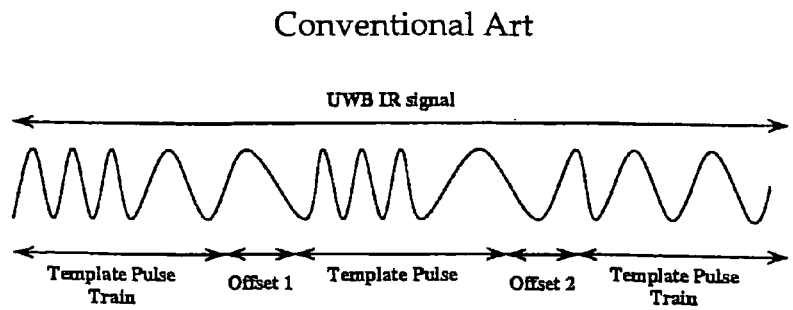
Fig. 4

Conventional Art

Conventional Art

SYNCHRONIZING METHOD FOR IMPULSE RADIO NETWORK

CROSS-REFERENCE TO RELATED APPLICATIONS

This application claims priority under 35 U.S.C. § 119 and/or 120 to U.S. Provisional Application No. 60/622,787 filed on Oct. 29, 2004.

INTRODUCTION

In IR (Impulse Radio) network, the conventional synchronization (also called signal acquisition) method becomes inefficient and results in a certain failure of synchronization when concurrent transmissions are allowed without controlling their powers. The present invention aims to solve this problem by introducing a novel synchronization method. Moreover, the claimed method can replace the conventional one in all IR networks.

BACKGROUND ART

Most of existing MAC protocol are based either on mutual exclusion (i.e. no other communication is possible within the same collision domain) or on a combination of power control and mutual exclusion. Exclusion is insured either by resource reservation (e.g. TDMA, FDMA . . . ) or with a collision management protocol (CSMA/CA). Power control improves spatial reuse and reduces interference by adapting the transmitting power of the nodes. Combining both mechanisms allows for limited amount of concurrent transmissions.

Recently, it is proven that the optimal MAC layer should not use power control but should send at full power whenever it sends. Furthermore, practical results show that it is optimal, in terms of throughput, to allow interfering sources to transmit simultaneously, and it is optimal to adapt the channel code to these interferences.

Such MAC protocol is DCCMAC (Dynamic Channel Coding—MAC), which has just appeared. According to DCC-MAC, all nodes transmit concurrently at their full power. However, the interference caused by this transmission scheme of DCCMAC results in a catastrophic failure of synchronization using the conventional synchronization method since it assumes exclusion or/and power control schemes are applied. This is the first work that identifies this problem. Indeed, these finding of prior art, i.e. to transmit concurrently at the maximum power are quite recent. Further, up to the moment of writing the present document, DCCMAC is the only work that uses them and it deals only data transmission, and synchronization is out of its scope.

The document US 2004/0161064 describes an integrated circuit for processing UWB (Ultra Wide Band) IR (Impulse Radio) signal including synchronization method. The synchronization method is based on the correlation between the IR signal and the TPT (Template Pulse Train). Once the correlation output exceeds some threshold, then the signal is detected. This detection might be followed by several verification stages. The threshold is set based on equations dealing correlation output statistics.

Unlike our invention, this publication does not solve the problem of misdetection due to different power level in the signal.

The document WO 01/93444 describes methods to acquire the synchronization and for tracking based on the conventional method, i.e. a correlation is performed between the IR signal and the TPT and the detection decision is based on the correlation output. The method is described with respect to an UWB IR signal. After sweeping all search bins, the receiver locks on the bin that corresponds to the largest correlation output. This detection could be followed by several verification stages.

Unlike our invention, this publication does not solve the problem of misdetection due to different power level in the signal.

The patent U.S. Pat. No. 6,556,621 describes a synchronization method based on the conventional method. The method is described with respect to an UWB IR signal. A sweeping of search bins starts and a correlation between the TPT and the incoming UWB IR signal is performed for each bin. Sweeping search bin is done by shifting the TPT in time. A threshold check is performed on the correlation output. Once the correlation output passes this check, i.e. it is larger than the threshold, the synchronization is achieved. Supplement verification stages could be done.

Still unlike our invention, these publications does not solve the problem of misdetection due to different power level in the signal

SUMMARY OF THE INVENTION

The claimed invention consists in a method to synchronize impulse radio signal in a receiver based on a cross-correlation between an input signal and a template pulse train, this method having the steps of:
a. receiving a radio signal,
b. performing a correlation between the acquired radio signal and a template pulse train,
c. splitting the correlation into at least two elementary correlations over intervals of predefined length and separated by a predetermined time to obtain elementary correlation output,
d. performing an elementary threshold check on each elementary correlation output,
e. summing the elementary threshold check outputs to form a sum result.

Both methods, the conventional and claimed ones, are based on correlating the received IR signal with a template. The main difference between them is that the claimed method deploys several elementary correlations, instead of one with the conventional method. Each elementary correlation is followed by a threshold check to detect pulses. Then, with this method, the signal detection is related to the number of detected pulses.

BRIEF DESCRIPTION OF THE DRAWINGS

The invention will be better understood thanks to the attached Figures in which:

the FIG. 1 shows a first derivative Gaussian pulse, the FIG. 2 shows a frame structure in DCCMAC, the FIG. 3 shows a preamble structure, the FIG. 4 shows the operation of shifting the TPT by an offset, the FIG. 5 shows the comparison method between the TPT and the IR signal, the FIG. 6 shows the conventional detection method, the FIG. 7 shows the scenario showing the problem with the conventional detection method, the FIG. 8 shows the claimed detection method, the FIGS. 9 and 10 show two generic synchronization process block diagrams.

DETAILED DESCRIPTION OF THE INVENTION

Figure 5:
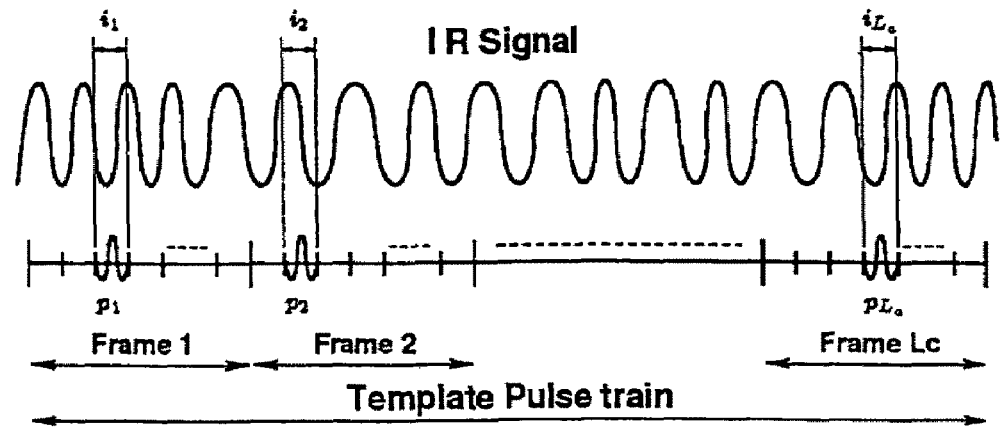

The present invention will be described with respect to preferred embodiments in a specific context, namely an UWB (Ultra Wide Band) wireless communication system using IR. However, it should be appreciated that the present invention can be embodied in a wide variety of the specific contexts. The specific embodiments discussed in this application are merely illustrative of specific ways to make use the invention, and do not limit the scope of the invention.

The Physical Layer Model

For illustrative purpose, we adopt in this invention the physical layer proposed by Win-Scholtzs, as an exemplary embodiment of an UWB IR physical layer. It uses pulse position modulation (PPM). The used pulse is the second derivative of Gaussian pulse (see FIG. 1). Time is slotted in chips of very short duration Tc; chips are organized in frames of length PRP chips (see FIG. 2). PRP stands for Pulse Repetition Period. A node transmits one pulse in one chip per frame, and uses a pseudo-random THS (Time Hoping Sequence) to determine in which chip to transmit, which is uniformly distributed over the frame. THSs permit different sources to share the channel i.e. source destination pairs use different independent, pseudo random, uniformly distributed THS. Further, they avoid energy peaks in the frequency domain.

Conventional Synchronization Method

The conventional synchronization method has been recently adopted in an extensive work investigating their different algorithms in UWB IR based networks. In the following, we elucidate the basics of the conventional synchronization method.

Consider a UWB IR based communication between a transmitter and a receiver. Initially, the transmitter and the receiver are not synchronized. To achieve the synchronization between the transmitter and the receiver, the first packet exchanged between them has to have a specific preamble structure as shown in the FIG. 3. It comprises periodic identical sequences identifying the transmitter, each sequence including frames. The preamble consists of a periodic sequence of fixed number of frames that carry one pulse in each of them. The pulse positions, i.e. the index of the chip in which the pulse takes place, in the frames of the periodic sequence are predetermined by a known code for the transmitter and the receiver. The number of frames in the sequence defines the code length $L_c$. Since the receiver knows the code used by the transmitter, the receiver knows the relative locations of the pulses in the sequence relative to each other, but the receiver does not know when in time the sequence begins or when in time the preamble of the transmitted packet begins. To get synchronized with the transmitter, the receiver uses a TPT (Template Pulse Train) which is a replica of the sequence used by the transmitter. The TPT is compared by a cross-correlator to the received impulse radio signal, which may or may not have the identical pattern of pulses as the TPT. Through shifting the TPT, the TPT is placed at various locations in time as compared to the received impulse radio signal until a match is obtained between the TPT and the received impulse radio signal.

The FIG. 4 illustrates shifting the TPT by an offset. After being located at a first position 1, it is compared to the received IR signal corresponding to the same location. If no match is obtained, the TPT is offset in time by a first offset 1 to a second position to be compared again with the corresponding received IR signal, and so on until a match appears. Shifting the TPT by an offset aims to cover each possible combinations of the TPT and the received IR signal. The offset values depend on the used search algorithm.

Figure 6:
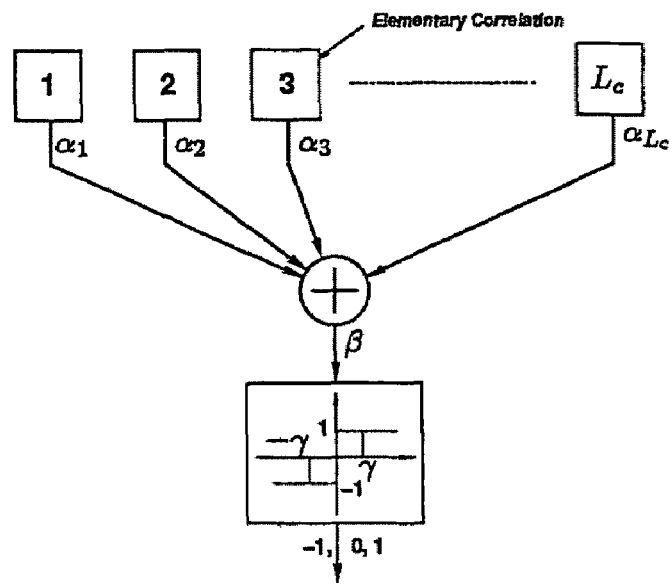

Notice that the correlation between the TPT and the IR signal in the conventional synchronization method can be interpreted as $L_c$ elementary cross-correlations. These $L_c$ elementary cross-correlations correspond to the $L_c$ correlations of the TPT pulses and their corresponding intervals of the IR signal. For instance, the pulse $p_1$ of the TPT in FIG. 5 is correlated with the interval $i_1$ of the IR signal, the pulse $p_2$ with $i_2$, and so on. In FIG. 6, the $L_c$ elementary cross-correlations are presented by the blocks indexed from 1 to $L_c$. $\alpha_i$ is the output of the elementary cross-correlation i that corresponds to the $i^{th}$ pulse in the TPT. Then, the cross-correlation output of the TPT with the IR signal is $$\beta = \sum_{i=1}^{Lc} \alpha_i,$$

which consists the input of the decision block, which in turn performs a threshold check. Hence, a match between the TPT and the IR signal is declared if $\beta$ exceeds certain threshold $\gamma$.

Example Showing the Problem with the Conventional Synchronization Method

To show the inefficiency of the conventional synchronization method, we present one scenario that is based on the measurement done by M. Win and R. Scholtz in [3]. Consider a source that is 10 m far from the receiver. The measurement in [3] gives that the amplitude of the strongest source pulse seen by the receiver is in the order of 0.03V. Assume now that there is an interferer that is 1 m away from the receiver. The measured amplitude of the interfering pulse is of 1V, 33 times higher than the source pulse. In this case, the cross-correlation between an interfering pulse and a pulse of the TPT results in an output 33 times higher than the output of the cross-correlation between a source pulse and a TPT pulse. Note that, to be sensible to the source signal, $\gamma$ should be less than $L_c$ times the output of the cross-correlation between a source pulse and a TPT pulse. If $L_c \leq 33$, it is sufficient to have one interfering pulse aligned with one TPT pulse to get a FA (False Alarm).

In the FIG. 6, we have an illustration of the conventional detection method. The detection method can be interpreted as $L_c$ elementary cross-correlations. Block i, i=1 ..., $L_c$ presents the correlation of the $i^{th}$ pulse in the TPT with its corresponding interval.

Figure 7:
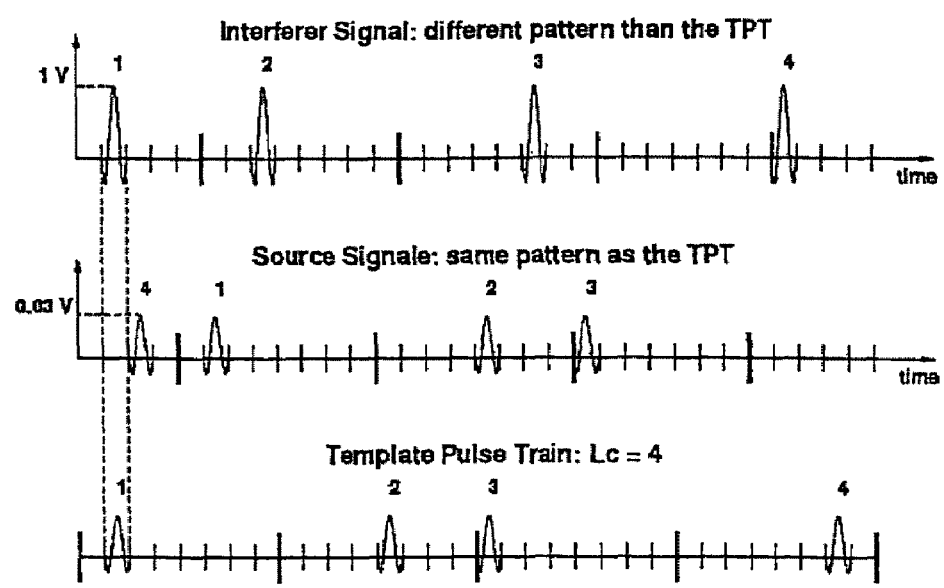

The FIG. 7 illustrates this scenario with $L_c$=4. The source signal has the same pattern as the TPT but it is shifted in time. Corresponding pulses in the TPT and the source signal carry the same number. As we notice there is one interferer pulse (pulse number 1 of the interferer signal) that is aligned with pulse number 1 of the TPT. In this case, a FA will occur since the code length $L_c$ is very small compared to the ratio between the source and the interferer signal.

To avoid this FA, but still using the conventional synchronization method, $L_c$ must be much larger than 33, which consists an extremely unaffordable overhead in term of synchronization time, since the synchronization time is proportional to the code length $L_c$. On the other hand, if $L_c$ is smaller than 33, e.g. $L_c$=8, the analysis shows that, when a match between the TPT and the received IR signal is declared by the decision block, this declaration is a FA with probability 0.984. Note that, when the number of concurrent transmissions increases, the situation becomes worse.

To summarize this example, the synchronization is either unfeasible or consists an extremely large overhead using the conventional synchronization method in none-power control IR networks when concurrent transmissions are allowed.

Synchronizing Method of the Invention

The idea behind the cross-correlation between the TPT and the IR signal is to detect a match between them. We need to find in the IR signal $L_c$ pulses that have the same pattern as the TPT. But the conventional synchronization method does not do this. It looks at the energy captured by the correlation between the TPT and the received IR signal, which is indicated by $\beta$ in FIG. 6, regardless its distribution over the $L_c$ elementary correlations. So, if this energy $\beta$, is larger than the threshold, we say that the synchronization is achieved. But what about if the whole energy comes from one elementary correlation, e.g. $\beta=\alpha_1$ and $\alpha_1=0$, i=2, ... $L_c$ ? And this is the bug in the scenario shown in the above example in the case where $L_c \leq 33$.

Figure 8:
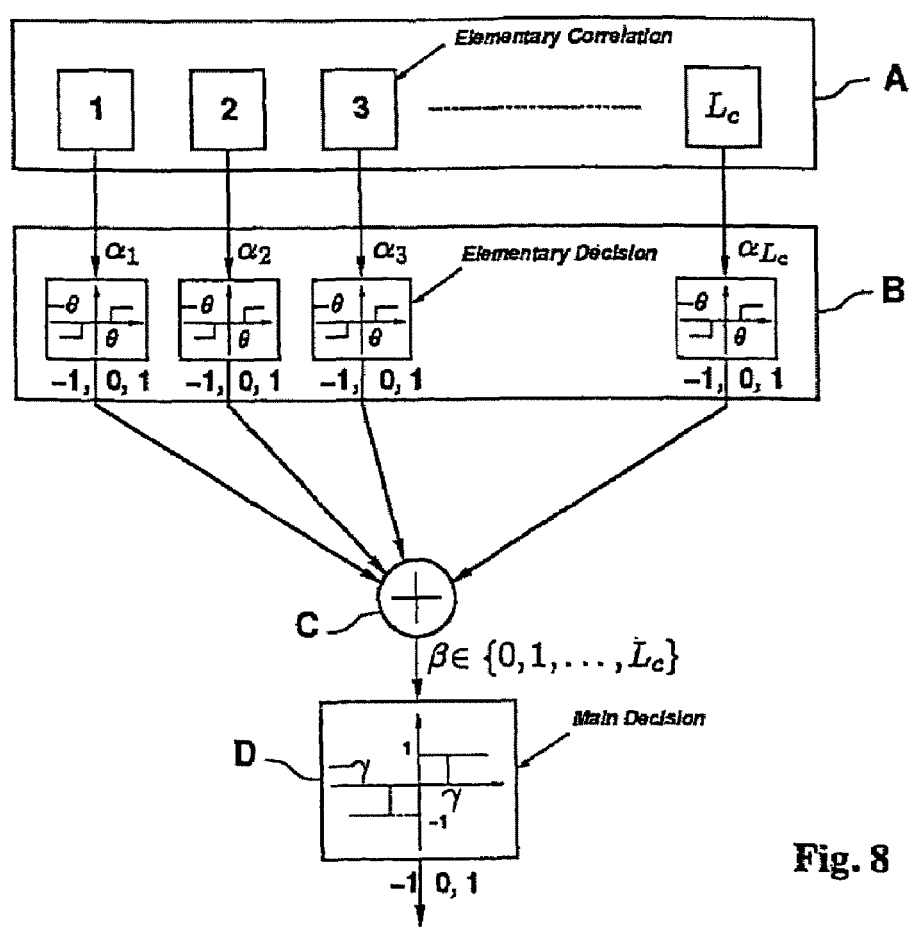

This is illustrated in the FIG. 8 with the so called PIS (Power Independent Synchronization) method. Each pulse is detected based on an elementary decision block. The final detection decision is based on the number of pulses detected.

Unlike the conventional synchronization method, the PIS method solves the problem by looking at the individual energy captured by each elementary correlation separately, i.e. by looking at each $\alpha_i$ separately, i=1, ..., $L_c$. If $\alpha_i$ is larger than certain threshold $\theta$, we consider that a pulse is detected in the $i^{th}$ pulse corresponding interval $i_i$. Then, neglecting the noise effect, the synchronization is achieved once a pulse is detected in each pulse corresponding interval, i.e. $\alpha_i \leq \theta$, i=1, ..., $L_c$. The threshold $\theta$ is determined according to the minimum accepted signal to noise ratio.

FIG. 8 dictates the architecture of our invention; the output of each elementary correlation $\alpha_i$, i=1, ..., $L_c$, passes through an elementary decision block that performs a threshold check. If the absolute value of $\alpha_i$ is larger than $\theta$ then a pulse is detected in the interval $i_i$ and the output of the elementary decision block will be 1 or −1. Otherwise it will be 0. Let $\beta$ be the sum of the $L_c$ elementary Decision block outputs. If the absolute value of $\beta$ is larger than $\gamma$, the output of the main decision block will be 1 or −1 and thus a match will be declared between the IR signal and the TPT. In the opposite case the output of the main decision block will be 0.

It is clear that this new method solves the problem described in the above example. It is optimal in a none-power control environment since it is sensible to the existence of a pulse not to its power. It minimizes the multi-access interference due to different signal powers that constitutes a catastrophe in the conventional synchronization method. So we call our proposal "Power-Independent Synchronization" method.

Note that $\theta$ expresses the sensibility of the system (communication range), whereas $\gamma$ depends on the power of the synchronization sequence to combat interference.

To achieve synchronization, the procedure dictated in FIG. 8 must be repeated to cover all combinations between the TPT and the received IR signal or until a detection is declared by the main decision block.

In all cross-correlation based synchronization algorithm, the synchronization sequence is divided into N search bins. The bin width is equal to a small fraction of the pulse wavelength. If $\tau$ is the bin width, we have $N=L_c \times PRP \times T_o/\tau$. Then we refer by phase to the bin being searched.

Figure 9:
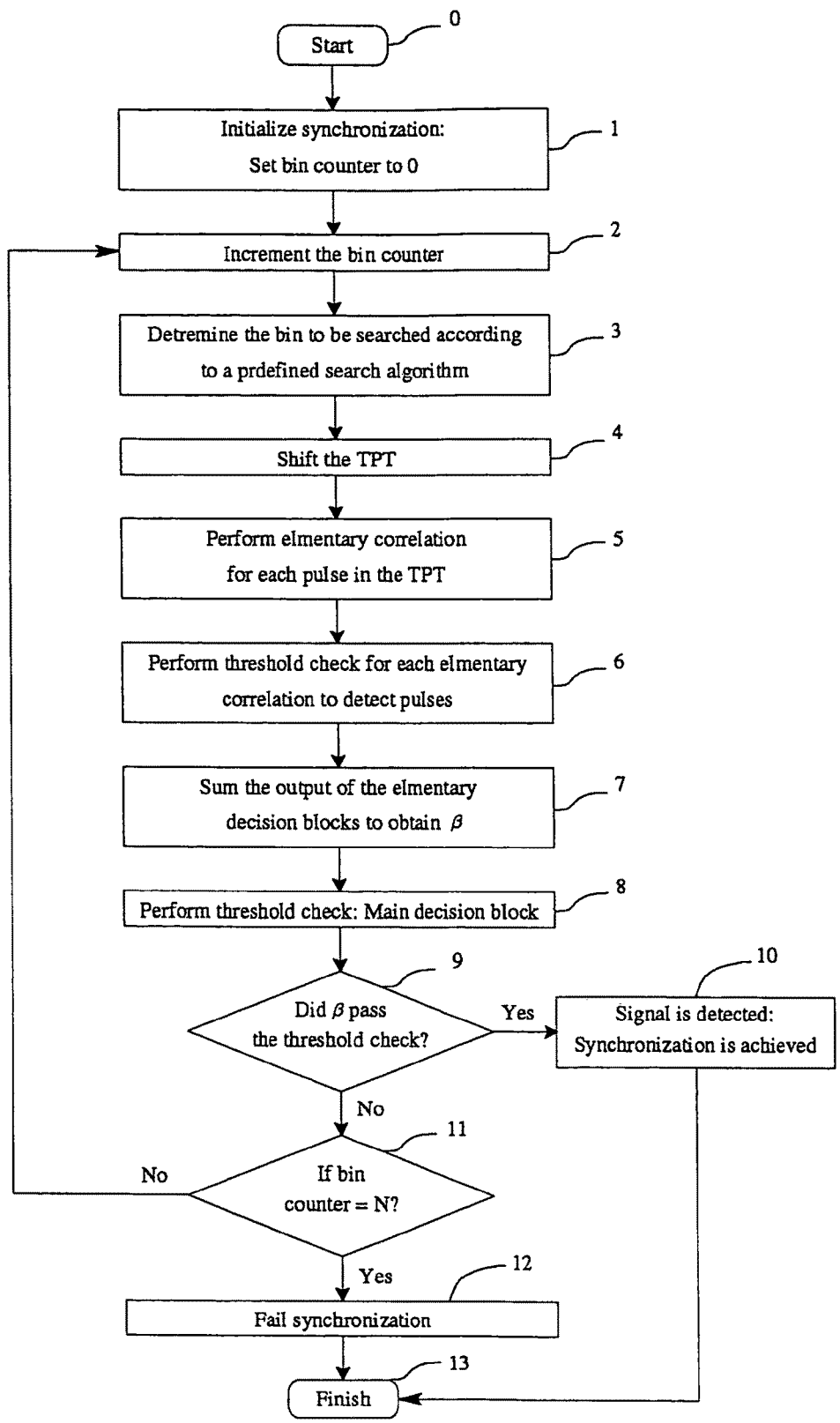

The FIG. 9 illustrates a generic synchronization method based on double threshold check done by elementary decision blocks and the main decision block.

The FIG. 9 is a flow diagram outlining an exemplary of a complete synchronization method performing double threshold check. In block 1, the bin counter that counts the number of searched bins is set to 0 in order to initialize the synchronization process. The bin counter is incremented in block 2 to indicate that a new bin is being searched. In block 3, the number of the bin to be searched is determined according to a predetermined search algorithm. This number takes value between 0 and N. In block 4, the TPT is shifted so that the bin to be searched is what is computed in block 3 by the search algorithm.

Many search algorithms arises in the literature. One embodiment algorithm is the serial search algorithm where the TPT is shifted, each time, by only one bin width. This scheme is known as fine step scanning.

Another embodiment search algorithm is the "look and jump K" algorithm. In a dense multipath channel, it is shown in [1] that "look and jump K" algorithm is the optimal algorithm in the presence of a significant number of consecutive signal bins since it has the least expected synchronization time. A signal bin is a particular bin where a match between the TPT and the received IR signal is detected. In this case, the offset is approximately equal to the time to receive most of the multipath IR signal. For instance, the offset can be approximately equal to the time of multipath reflections. Then, if K is the number of bins in the delay spread, starting in bin 0, the search continuous on to bin K, then to 2K, etc. This scheme is known as a coarse step scanning. Once a match is obtained between the TPT and the IR signal, we proceed with the fine step scanning to find the strongest path, that is the offset is now equal to the bin width.

Due to the varying channel conditions, the delay spread is not known exactly. Also, the signal bins due to a large delay spread are most likely not consecutive. In this case, the performance of "look and jump K" may deteriorate since it relies on a previous knowledge of K and it assumes that the signal bins are consecutive.

As an alternative of "look and jump K", it is suggested in [1] to use the bit reversal search as an alternate of 'look and jump K' algorithm. The authors of [1] argue that both algorithm have exactly the same performance. The bit reversal search assume that N is a power of 2, e.g. $N=2^n$ where n is a positive integer. Then, each bin is coded using n bits. The bins to be tested are chosen by reversing the binary sequence of bin indexes from least significant bit to most significant bit. For example, if N=8, the corresponding bin indexes are: 000, 001, 010, 011, 100, 101, 110 and 111. Consequently, the bins are scanned in the following order: 000, 100, 010, 110, 001, 101, 011, and 111. Bit reversal search aims to maximize the distance between observations.

Blocks 5, 6, 7 and 8 are similar to blocks A, B, C and D of FIG. 8 respectively.

If β is larger than the main decision block threshold, γ, then block 10 declares that the signal is detected. Otherwise, if the value of the bin counter is equal to N, that is all bins has been searched and no match between the TPT and the received IR signal has detected, the flow passes to block 12 that declares of the synchronization process. This happens either because of noise and interference, or the received signal does not contain the IR signal that has the same pattern as the TPT.

If the value of the bin counter is less than N, then the flow returns to block 2.

Figure 10:
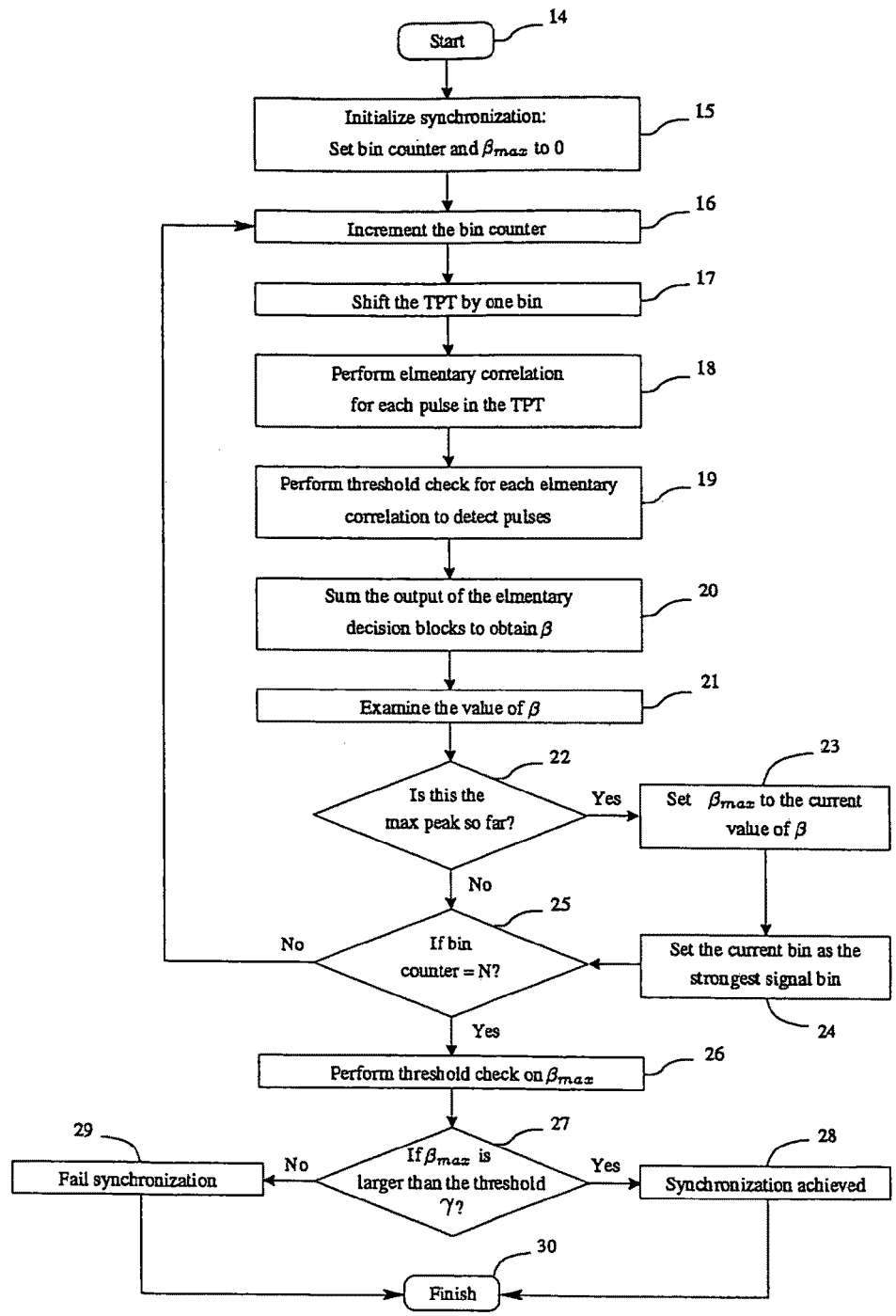

The FIG. 10 illustrates a generic synchronization method based on finding the bin that corresponds to the highest value of β. The search algorithm illustrated is the serial one.

After sweeping all search bins, the bin that corresponds to the highest value of β, $β_{max}$, is considered as the strongest signal bin if the absolute value of $β_{max}$ is larger than a threshold. In a multipath fading channel, this scheme aims to find the strongest multipath component whereas in the previous scheme of FIG. 9, the goal was to lock on any multipath component that has sufficient energy by performing a threshold check using the main decision block on each value of β.

In block 15, the bin counter and the variable $β_{max}$ are set to 0. Recall that $β_{max}$ is the variable that will carry the peak value of β. In block 16, the bin counter is incremented by one in each iteration. In block 17, the serial search is applied and the TPT is shifted by only one bin. Blocks 18, 19 and 20 are identical to blocks 5, 6 and 7 respectively. In block 21, the current value of β is examined to know whether it is the peak so far. If this is the case, $β_{max}$ is updated in block 23 and it is set to the current value of β. Then the current bin is saved as the strongest signal bin in block 24. Next, the flow goes to block 25. If the current value of β is not the highest so far, the flow goes immediately from block 22 to block 25.

In block 25, the value of the bin counter is tested. If it is equal to N, the total number of bin, this means the bin sweeping is finished. Then, the flow goes out of the loop to block 26. If the bin counter value is less than N, the flow returns to block 16. In block 26, a threshold check is performed on $β_{max}$. If $β_{max}$ is larger than the threshold y, than block 27 directs the flow to block 28 that declares that the synchronization is achieved. Otherwise, the flow is directed to block 29 that declares the failure of the synchronization.

CONCLUSIONS

The key finding if the invention of a new synchronization method, for IR networks, independent of the difference in power among different IR signals, called PIS method. The description is done according to preferred embodiments in a specific context, namely an UWB wireless communication system using IR. Indeed, we presented a scenario where the failure of the conventional synchronization method in UWB IR networks is certain in the absence of power control. The conventional method correlates the IR signal with the whole TPT and compares the result to a threshold. An alignment is detected if the correlation result exceeds the threshold. In contrast, PIS method gets correlation result for each pulse in the TPT. Then, each result is compared to a threshold to detect the existence of a pulse. The output of this threshold check is −1, 0 or 1. Next these outputs are summed to be compared to another threshold in order to detect a match between the TPT and the received IR signal. PIS method detects pulses independently from each other. Consequently, unlike the conventional method, PIS method avoids the problem that the whole energy obtained by correlating over the entire TPT is concentrated in one or a few elementary correlations. The superiority of PIS method over the conventional one is well proved in.

BIBLIOGRAPHY

1: E. A. Homier and R. A. Scholtz. "Rapid Acquisition of Ultra-wideband Signals in the Dense Multipath Channel". IEEE Conference on Ultra Wideband Systems and Technologies, 2002.
2: Moe Z. Win, Robert A. Scholtz. "Ultra-Wide Bandwidth Time-Hopping Spread-Spectrum Impulse Radio for Wireless Multiple-Access Communications". IEEE TRANSACTIONS ON COMMUNICATIONS, VOL. 48, NO. 4, APRIL 2000.
3: M. Z. Win, R. A. Scholtz, and M. A. Barnes. "Ultra-wide bandwidth signal propagation for indoor wireless communications". In Proc. IEEE Int. Conf. Communications, vol. 1, Montreal, Canada, June 1997, pp. 56 60.

What is claimed is:

1. A method to synchronize an impulse radio signal in a receiver based on a cross-correlation between an input signal and a template pulse train, this method comprising:
   a. receiving a radio signal,
   b. applying a reference pulse train,
   c. splitting the radio signal according to the template pulse train contained in the reference pulse train to obtain a plurality of elementary samples,
   d. executing at least one unitary cross-correlation on at least one of the plurality of elementary samples with the reference pulse train to obtain a cross-correlation result,
   e. applying a threshold check on each cross-correlation result, wherein each cross-correlation result has the same weighting to obtain a threshold-checked cross-correlation result,
   f. summing each threshold-checked cross-correlation result to form a sum result of an output signal,
   g. storing the sum result,
   h. shifting the template pulse train by a predetermined offset,
   i. performing steps b-to-g with the shifted template pulse train to the received radio signal, j. determining the highest sum result over a given time period, wherein the threshold-checked cross-correlation result has three states, i.e. positive, zero and negative.

2. Method of claim 1, wherein the threshold of the threshold check is set according to the minimum accepted signal to noise ratio.

3. Method of claim 1, wherein a main threshold check is performed on the sum result, and in case the sum result passes the main threshold check, the receiver locks on the impulse radio signal, otherwise the receiver shifts the template pulse train by a predefined offset and repeat b to f.

4. Method of claim 1, wherein the method further comprises:

locking the impulse radio signal at the phase corresponding to the highest sum result.

5. Method of claim 1, wherein the method further comprises:

comparing the highest sum result with a predefined threshold, locking the impulse radio signal at the phase corresponding to the highest sum result if the highest sum result is above the threshold.

* * * * *